United States Patent
Lin et al.

(10) Patent No.: US 8,984,455 B1
(45) Date of Patent: Mar. 17, 2015

(54) METHODS FOR GENERATING SCHEMATIC DIAGRAMS AND APPARATUSES USING THE SAME

(71) Applicant: Wistron Corp., New Taipei (TW)

(72) Inventors: Feng-Ling Lin, New Taipei (TW); Wen-Jui Kuo, New Taipei (TW); Lee-Chieh Kang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/084,437

(22) Filed: Nov. 19, 2013

(30) Foreign Application Priority Data

Sep. 24, 2013 (TW) .............................. 102134238 A

(51) Int. Cl.
*G06F 17/50* (2006.01)
*G06F 15/04* (2006.01)

(52) U.S. Cl.
CPC .................................. *G06F 17/5077* (2013.01)
USPC .......................................... 716/102; 716/139

(58) Field of Classification Search
USPC ................................................... 716/102, 139
See application file for complete search history.

(56) References Cited

U.S. PATENT DOCUMENTS

| | | | |
|---|---|---|---|
| 8,324,937 B2 | 12/2012 | Verbauwhede et al. | |
| 2004/0083441 A1* | 4/2004 | Gweon et al. | 716/12 |
| 2005/0071715 A1* | 3/2005 | Kolman | 714/724 |
| 2008/0141194 A1* | 6/2008 | Kumagai | 716/5 |
| 2010/0313178 A1* | 12/2010 | Kumagai | 716/119 |
| 2014/0123088 A1* | 5/2014 | Tanisho | 716/107 |

* cited by examiner

*Primary Examiner* — Stacy Whitmore
*Assistant Examiner* — Magid Dimyan

(57) ABSTRACT

An embodiment of the invention introduces a method for generating schematic diagrams, executed by a processing unit of an apparatus, which comprises the following steps. A pin-editing interface comprising a data table is generated to assist a user to configure pin settings. A user setting is obtained via the pin-editing interface, and a schematic diagram is generated on a display unit according to the obtained user setting.

14 Claims, 10 Drawing Sheets

```
                                    220
                             320  ↙
                             ╱
                            AN8
310~ USB2N0 ├────────────
     USB2P0   AM8
            ├────────────
              AR7
     USB2N1 ├────────────
     USB2P1   AI7
            ├────────────
              AR8
     USB2N2 ├────────────
     USB2P2   AP8
            ├────────────
              AR10 ╳
     USB2N3 ├────────────
     USB2P3   AI10 ╳
            ├────────────
              AM15
     USB2N4 ├────────────
     USB2P4   AL15
            ├────────────
              AM13
     USB2N5 ├────────────
300  USB2P5   AN13
            ├────────────
              AP11
     USB2N6 ├────────────
     USB2P6   AN11
            ├────────────
              AR13
     USB2N7 ├────────────
     USB2P7   AP13
            ├────────────
              G20
     USB3RN1├────────────
     USB3RP1  H20
            ├────────────
              C33
     USB3TN1├────────────
     USB3TP1  B34
            ├────────────
              E18
     USB3RN2├────────────
     USB3RP2  F18
            ├────────────
              B33
     USB3TN2├────────────
     USB3TP2  A33
```

FIG. 3

| Group Name | Net Name | | | Connectivity Status | Cross-page Status | I/O Status |
|---|---|---|---|---|---|---|
| | Option 1 Duplication~810 | Option 2 Duplication~820 | Confirmation | Yes/No | Yes/No | In/Out/Bi |
| | Pin Name | Recommended Net Name | | | | |
| USB3_CTRX | USB3TP2 | USB3_PTX_CRX_P1 | | Yes ▽ ~830 | Yes ▽ ~840 | Bi ▽ ~850 |
| | USB3TP1 | USB3_PTX_CRX_P0 | | | | |
| | USB3TN2 | USB3_PTX_CRX_N1 | | | | |
| | USB3TN1 | USB3_PTX_CRX_N0 | | | | |
| | USB3RP2 | USB3_PRX_CTX_P1 | | | | |
| | USB3RP1 | USB3_PRX_CTX_P0 | | | | |
| | USB3RN2 | USB3_PRX_CTX_N1 | | | | |
| | USB3RN1 | USB3_PRX_CTX_N0 | | | | |

| FIG. 8A |
|---|
| FIG. 8B |

| USB2_PN | USB2P7 | USB_PP7 | | | | | |
| | USB2P6 | USB_PP6 | | | | | |
| | USB2P5 | USB_PP5 | | | | | |
| | USB2P4 | USB_PP4 | | | | | |
| | USB2P1 | USB_PP1 | | | | | |
| | USB2N7 | USB_PN7 | | | | | |
| | USB2N6 | USB_PN6 | | | | | |
| | USB2N5 | USB_PN5 | | | | | |
| | USB2N2 | USB_PN2 | | | | | |
| | USB2N1 | USB_PN1 | | | | | |
| | USB2N0 | USB_PN0 | | | | | |

METHODS FOR GENERATING SCHEMATIC DIAGRAMS AND APPARATUSES USING THE SAME

CROSS REFERENCE TO RELATED APPLICATIONS

This Application claims priority of Taiwan Patent Application No. 102134238, filed on Sep. 24, 2013, the entirety of which is incorporated by reference herein.

BACKGROUND

1. Technical Field

The present invention relates to schematic design, and in particular, to methods for generating schematic diagrams and apparatuses using the same.

2. Description of the Related Art

It consumes excessive time for an engineer to draw schematic diagrams in schematic design, for example by drawing a line and assigning a net name for each pin. A total number of nets in an information product typically are in the thousands, and each net may include five or more pins. In addition, the connectivity of the net pins usually crosses tens of pages, causing the engineer to spend much time with the trivial tasks of assigning net symbols, net names and cross page symbols. However, the routine manual operations can easily go wrong, and it may cause the production machine to malfunction when the schematic diagram has errors. Thus, it is desirable to have methods for generating schematic diagrams and apparatuses using the same to not only reduce the drawing time but also eliminate errors that happen in schematic diagrams.

BRIEF SUMMARY

An embodiment of the invention introduces a method for generating schematic diagrams, executed by a processing unit of an apparatus, which comprises the following steps. A pin-editing interface comprising a data table is generated to assist a user to configure pin settings. A user setting is obtained via the pin-editing interface, and a schematic diagram is generated on a display unit according to the obtained user setting.

An embodiment of the invention introduces an apparatus for generating schematic diagrams, which comprises a display unit and a processing unit. The processing unit coupled to the display unit generates a pin-editing interface comprising a data table to assist a user to configure pin settings, obtains a user setting via the pin-editing interface, and generates a schematic diagram on a display unit according to the user setting.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

FIG. 3 illustrates an initial schematic diagram according to an embodiment of the invention;

FIGS. 8A and 8B illustrate an exemplary pin-editing interface;

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
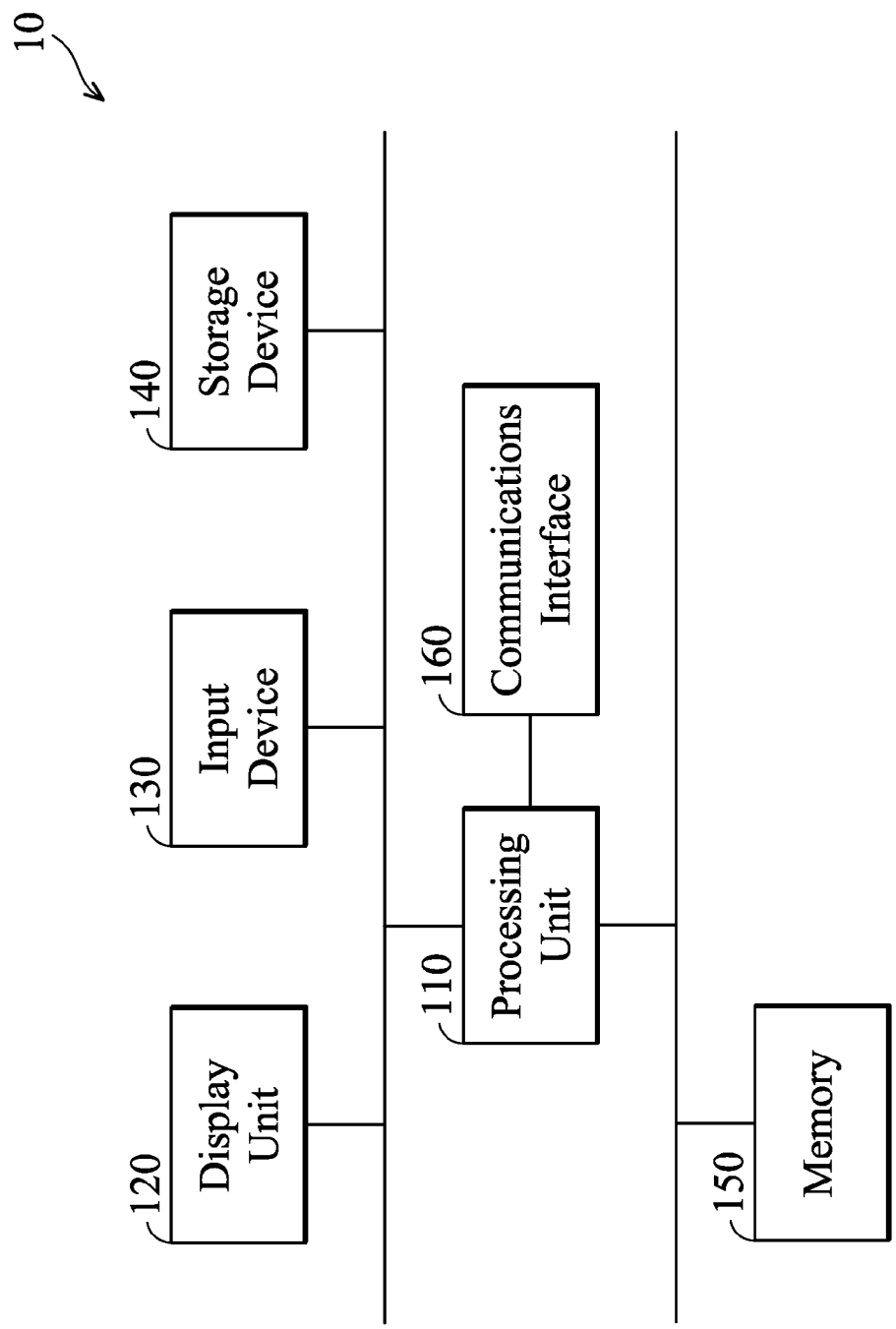
FIG. 1 is the system architecture of an electronic device according to an embodiment of the invention.

FIG. 1 is the system architecture of an electronic device according to an embodiment of the invention. The system architecture 10 may be practiced in a desktop computer, a notebook computer, or others, at least including a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited hereinafter. The system architecture 10 further includes a memory 150 for storing necessary data in execution, such as variables, data tables, or others, and a storage unit 140 for storing a wide range of electronic files, such as documents, schematic diagrams, net lists, or others. A communications interface 160 is included in the system architecture 10 and the processing unit 110 can communicate with other electronic devices thereby. The communications interface 160 may be a LAN (local area network) communications module, a WLAN (wireless local area network) communications module, a Bluetooth® communications module, or others. The system architecture 10 further includes one or more input devices 130 to receive a user input, such as a keyboard, a mouse, a touch panel, or others. A user may press hard keys of the keyboard to input characters, control a mouse pointer on a display by operating the mouse, or control an executed application with one or more gestures made on the touch panel. The gestures include, but are not limited to, a one-click, a double-click, a singlefinger dragging, and a multi-finger dragging. A display unit 120, such as a TFT-LCD (Thin film transistor liquid-crystal display) panel, an OLED (Organic Light-Emitting Diode) panel, or others, may also be included to display input letters, alphanumeric characters, and symbols, dragged paths, drawings, or screens provided by an application for a user's viewing.

Figure 2:
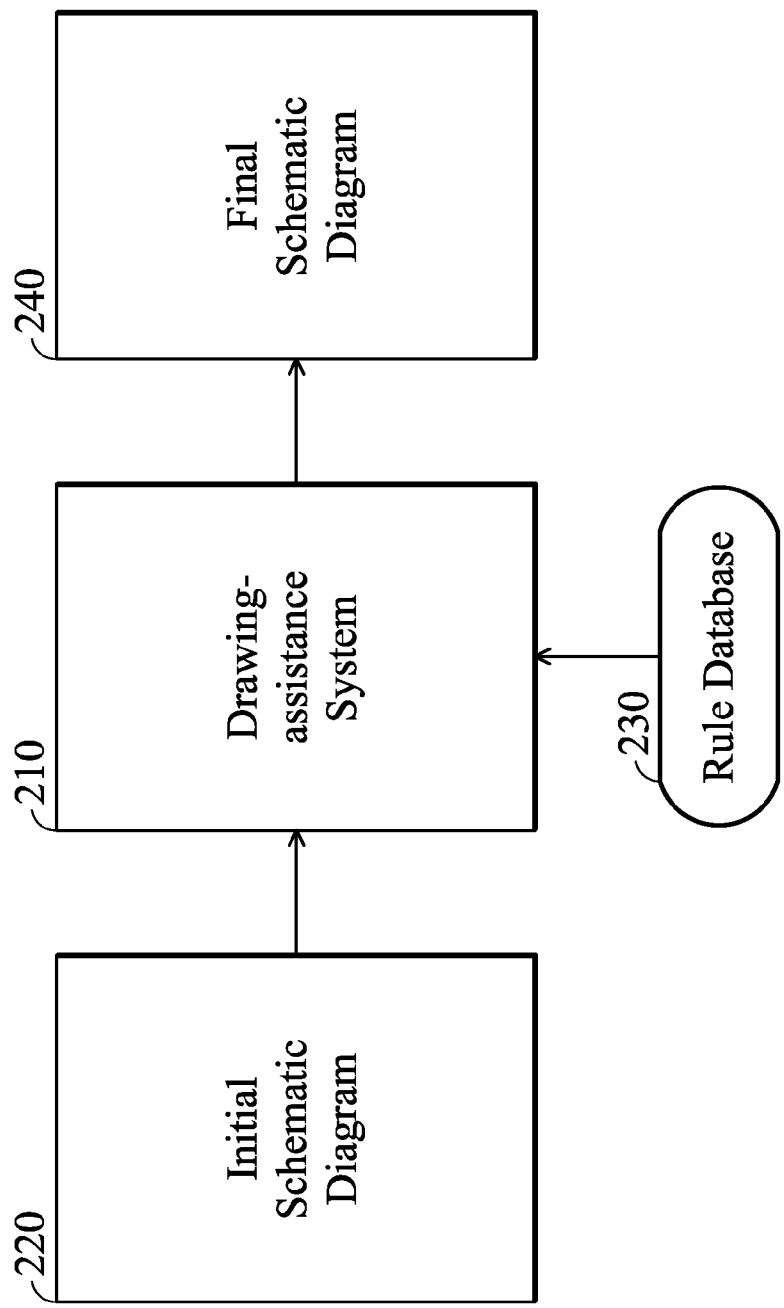
FIG. 2 is the system architecture of a schematic diagram-generation system according to an embodiment of the invention.
Figure 4:
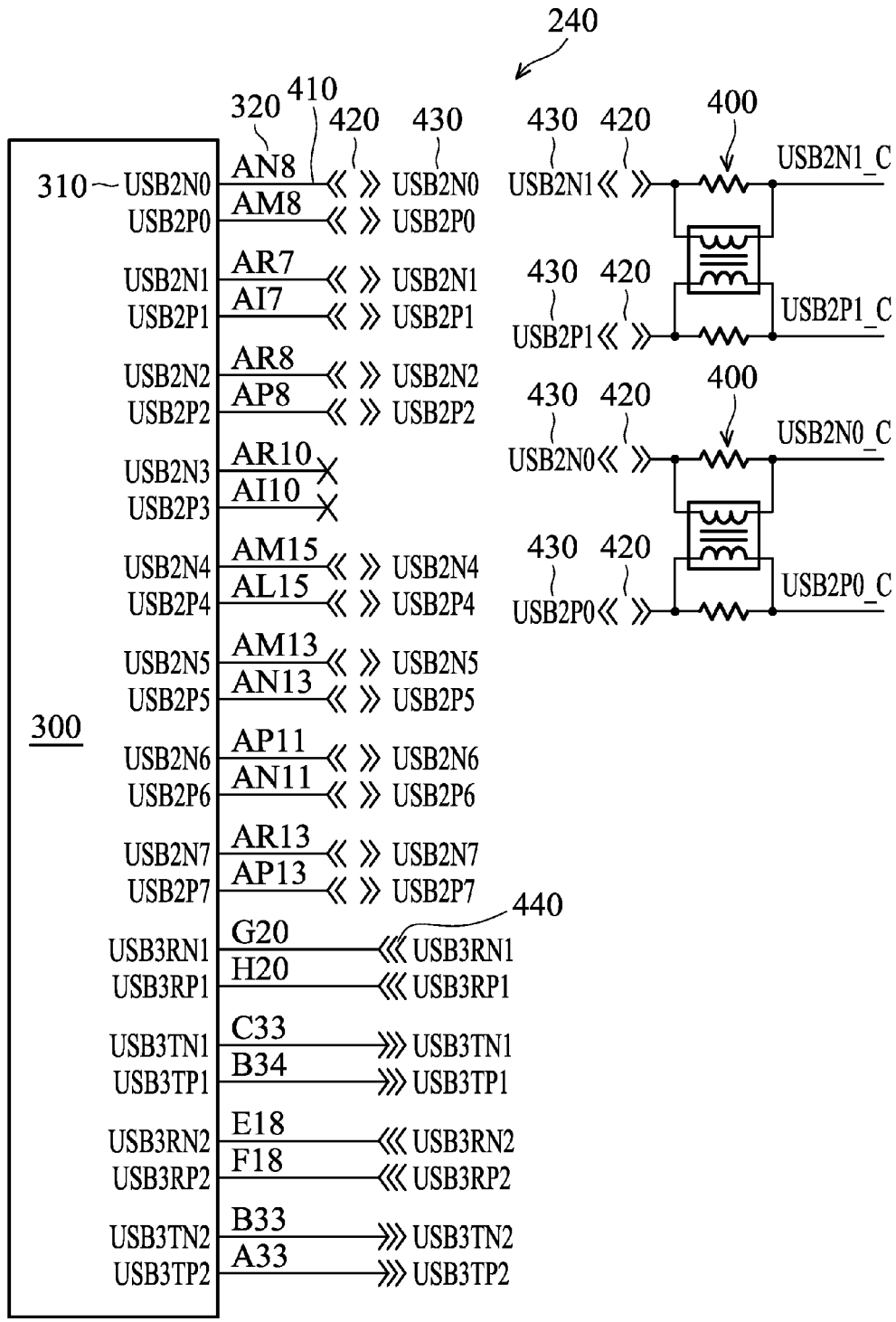
FIG. 4 illustrates a final schematic diagram according to an embodiment of the invention.

FIG. 2 is the system architecture of a schematic diagram-generation system according to an embodiment of the invention. An initial schematic diagram 220 includes information regarding all pins of each component, such as a chip, a chipset, a passive component, which, however, lacks connectivity information between pins of any two or more components. A drawing-assistance system 210 may import naming suggestions for pins from a rule database 230 and produce a data-table-based interface to assist settings to each pin by a user, for example, a net name, a connectivity status, a cross-page status, an I/O status, etc. FIG. 3 illustrates an initial schematic diagram according to an embodiment of the invention. The initial schematic diagram 220 shows a USB (Universal Serial Bus) chip 300 containing pins, and each pin has a pin name 310 and a pin location 320. However, no connectivity of any pin to another component is shown therein. If the USB chip shown is to be packaged in BGA (Ball Grid Array), the pin location 320 may be designated as a ball location. It should be understood that the initial schematic diagram 220 being input to the drawing-assistance system 210 does not limited it to a drawing; it is also feasible to have requisite information in a particular data structure, such as a data table, which is available to depict the drawing as shown in FIG. 3. FIG. 4 illustrates a final schematic diagram according to an embodiment of the invention. The final schematic diagram 240 not only depicts the USB chip 300 as shown in FIG. 3, but also components 400 connecting to relevant pins of the USB chip 300. In addition, the final schematic diagram 240 further shows a net symbol 410, an in-page I/O symbol 420, and a net name 430 for each pin of the USB chip 300 and the component 400. It means that the signal flowing between the pin and a corresponding component is bi-directional I/O when the pin I/O symbol 420 is denoted by "<< >>", single-directional output when it is denoted by ">>", and single-directional input when it is denoted by "<<". A cross-page I/O symbol 440 is presented at a terminal of a pin when a related component connected by the pin is not shown on the same page. It means that the signal flowing between the pin and a corresponding component on another page is bi-directional I/O when the cross-page I/O symbol 440 is denoted by "<<< >>>", single-directional output when it is denoted by ">>>", and single-directional input when it is denoted by "<<<". It could be observed from FIG. 4 that it presents the same net name for two pins when one pin of the USB chip 300 connects to one pin of one component 400.

Figure 5:
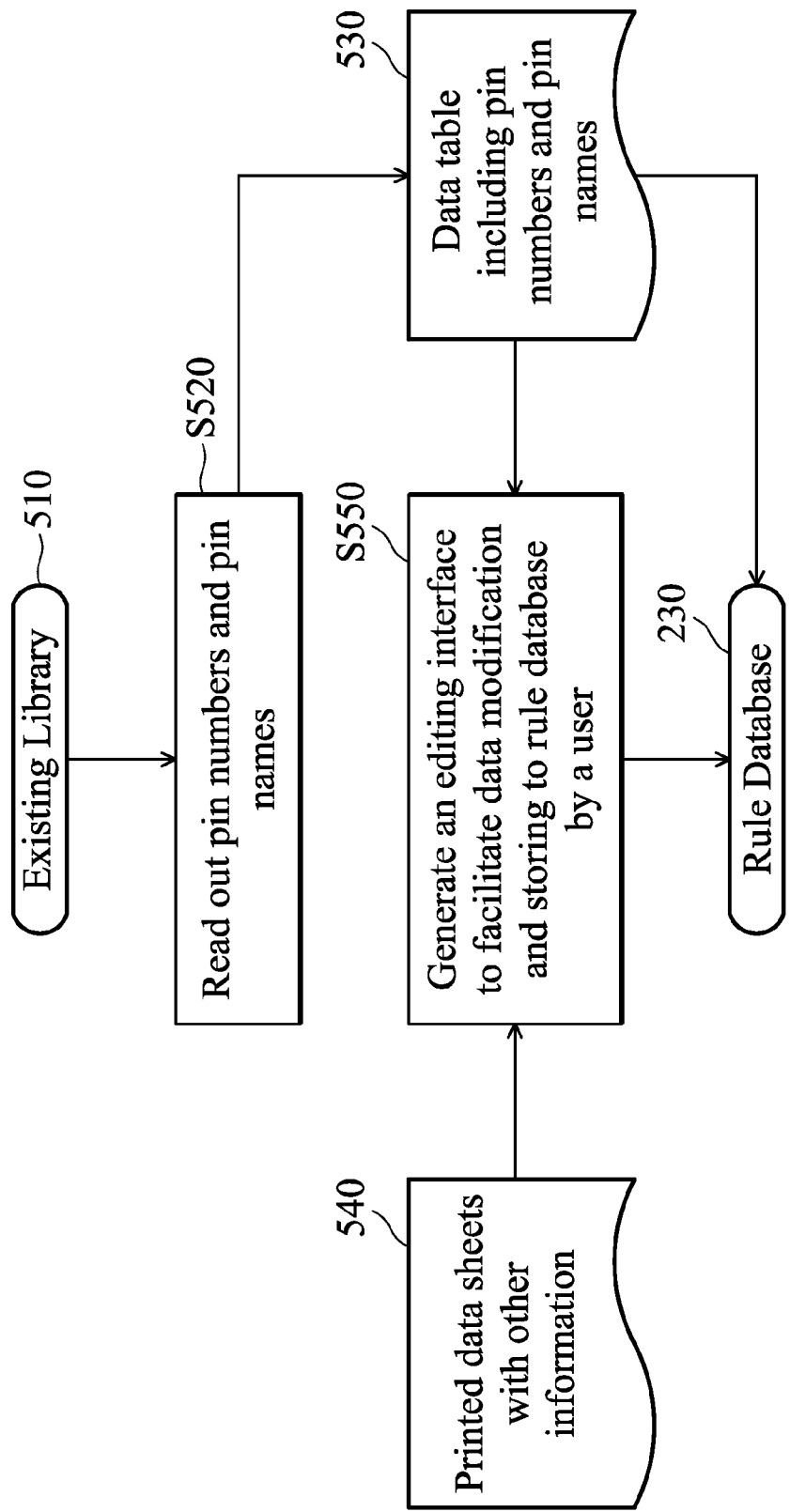
FIG. 5 is a schematic diagram for generating a rule database according to an embodiment of the invention.

FIG. 5 is a schematic diagram for generating a rule database according to an embodiment of the invention. In step S520, the processing unit 110 reads out pin numbers and pin names from an existing library 510 of the storage device 140, and accordingly generates a data table 530 including at least pin numbers and pin names. The existing library 510 may be an OrCAD ".olb" file. If a component will be packaged in BGA, the pin number may be designated as a ball number and the pin name may be designated as a ball name, interchangeably. In step S550, the processing unit 110 generates an editing interface. The editing interface displays an editable data table on the display unit 120 for a user, which includes pin numbers and pin names imported from the data table 530. The editing interface further provides two blank fields: a recommended net name; and a group name for each transaction, which can be input by a user. In addition to the imported pin numbers and pin names, the user may further refer to printed data sheets with other information 540 to complete the input of the recommended net names and the group names. The user may store the input data to the rule database 230 via the editing interface. The exemplary results of the rule database 230 may refer to the following table 1.

TABLE 1

| Pin_Number | Pin_Name | Rec_Net_Name | Group Name |
| --- | --- | --- | --- |
| A33 | USB3TP2 | USB3_PTX_CRX_P1 | USB3_CTRX |
| B34 | USB3TP1 | USB3_PTX_CRX_P0 | USB3_CTRX |
| B33 | USB3TN2 | USB3_PTX_CRX_N1 | USB3_CTRX |
| C33 | USB3TN1 | USB3_PTX_CRX_N0 | USB3_CTRX |
| F18 | USB3RP2 | USB3_PRX_CTX_P1 | USB3_CTRX |
| H20 | USB3RP1 | USB3_PRX_CTX_P0 | USB3_CTRX |
| E18 | USB3RN2 | USB3_PRX_CTX_N1 | USB3_CTRX |
| G20 | USB3RN1 | USB3_PRX_CTX_N0 | USB3_CTRX |
| AP13 | USB2P7 | USB_PP7 | USB2_PN |
| AN11 | USB2P6 | USB_PP6 | USB2_PN |
| AN13 | USB2P5 | USB_PP5 | USB2_PN |
| AL15 | USB2P4 | USB_PP4 | USB2_PN |
| AT10 | USB2P3 | USB_PP3 | USB2_PN |
| AT7 | USB2P1 | USB_PP1 | USB2_PN |
| AR13 | USB2N7 | USB_PN7 | USB2_PN |
| AP11 | USB2N6 | USB_PN6 | USB2_PN |
| AM13 | USB2N5 | USB_PN5 | USB2_PN |
| AR10 | USB2N3 | USB_PN3 | USB2_PN |
| AR8 | USB2N2 | USB_PN2 | USB2_PN |
| AR7 | USB2N1 | USB_PN1 | USB2_PN |
| AN8 | USB2N0 | USB_PN0 | USB2_PN |

The rule database 230 may be stored in a relational database server, such as the Microsoft® SQL (structure query language) server, the Sybase®SQL server, or other servers, which can be accessed by an application using the SQL.

Figure 6:
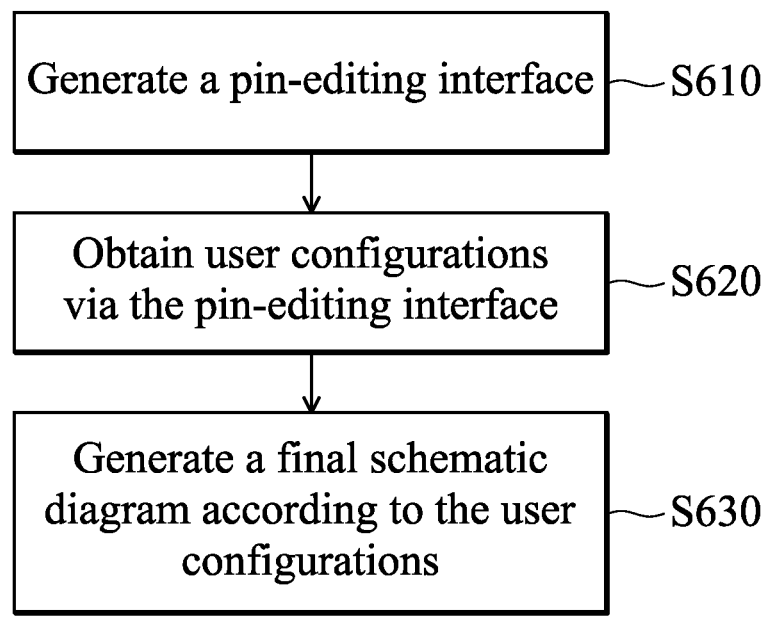
FIG. 6 is a flowchart illustrating a method for generating schematic diagrams, executed in the drawing-assistance system, according to an embodiment of the invention.

FIG. 6 is a flowchart illustrating a method for generating schematic diagrams, executed in the drawing-assistance system 210, according to an embodiment of the invention. The method is performed when the processing unit 110 loads and executes relevant program codes. In step S610, the processing unit 110 may query the relational database server to obtain information regarding group names, pin names and recommended net names of buses associated with a particular component using the SQL, and then, generate a pin-editing interface including a data table for a user to assist the configuration of each pin, such as a net name, a connectivity status, a cross-page status, an I/O status, etc. In step S620, user configurations are obtained via the pin-editing interface. In step S630, a final schematic diagram is generated according to the user configurations.

Figure 7:
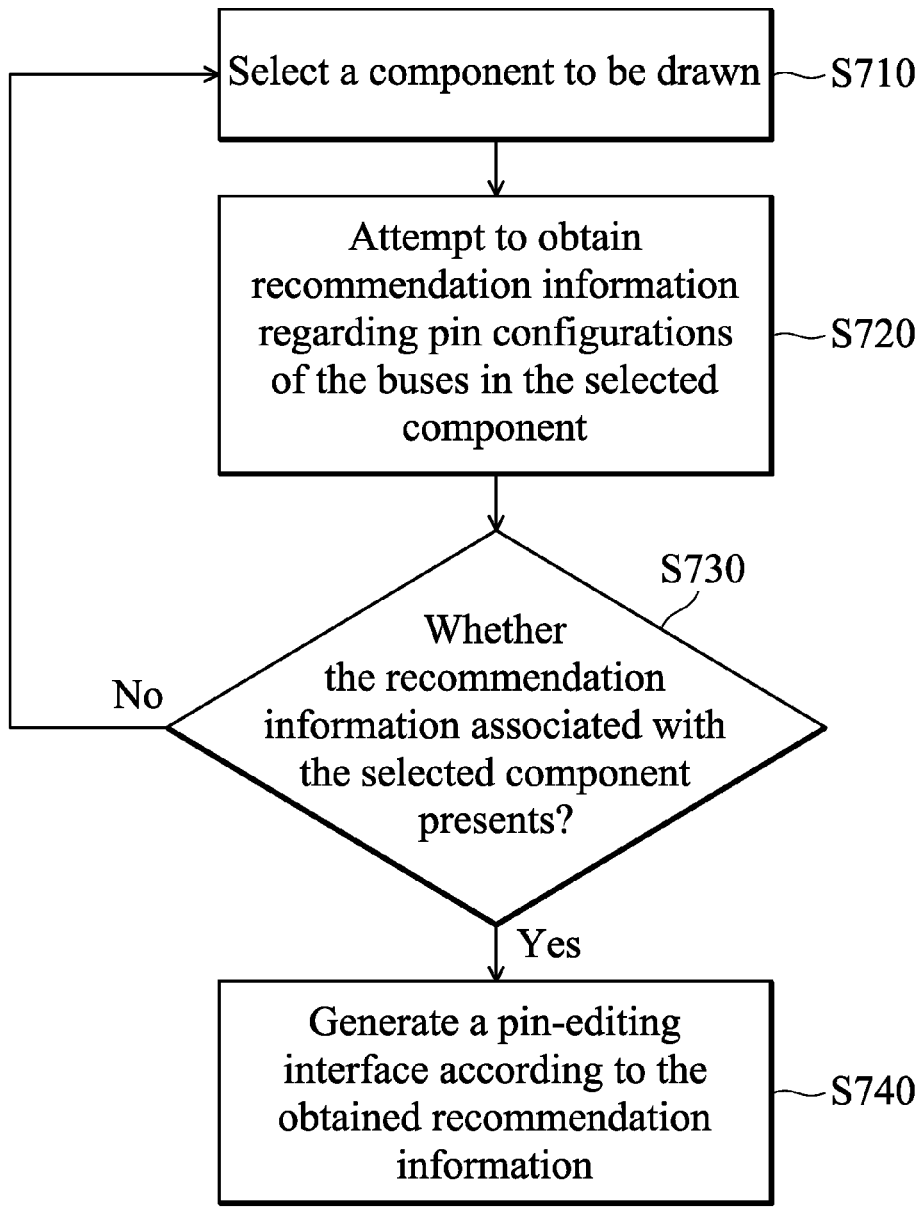
FIG. 7 is a flowchart illustrating a method for generating a pin-editing interface according to an embodiment of the invention.

Detailed technical features of step S610 in FIG. 6 are described as follows. FIG. 7 is a flowchart illustrating a method for generating a pin-editing interface according to an embodiment of the invention. In step S710, a component to be drawn is selected. The processing unit 110 may obtain a component selected by a user according to a signal output from the input device 130. In step S720, the rule database 560 is queried using the SQL to attempt to obtain recommendation information regarding pin configurations of the buses in the selected component. The recommendation information may include at least the aforementioned group names, pin names and recommended net names. Next, in step S730, it is determined whether the recommendation information associated with the selected component presents according to a reply message. If so, the process proceeds to step S740 to generate a pin-editing interface according to the queried recommendation information; otherwise, the process loops back to step S710 to re-select a new component. The query results may refer to the following table 2.

TABLE 2

| Group Name | Pin_Name | Rec_Net_Name |
|---|---|---|
| USB3_CTRX | USB3TP2 | USB3_PTX_CRX_P1 |
| | USB3TP1 | USB3_PTX_CRX_P0 |
| | USB3TN2 | USB3_PTX_CRX_N1 |
| | USB3TN1 | USB3_PTX_CRX_N0 |
| | USB3RP2 | USB3_PRX_CTX_P1 |
| | USB3RP1 | USB3_PRX_CTX_P0 |
| | USB3RN2 | USB3_PRX_CTX_N1 |
| | USB3RN1 | USB3_PRX_CTX_N0 |
| USB2_PN | USB2P7 | USB_PP7 |
| | USB2P6 | USB_PP6 |
| | USB2P5 | USB_PP5 |
| | USB2P4 | USB_PP4 |
| | USB2P3 | USB_PP3 |
| | USB2P1 | USB_PP1 |
| | USB2N7 | USB_PN7 |
| | USB2N6 | USB_PN6 |
| | USB2N5 | USB_PN5 |
| | USB2N2 | USB_PN2 |
| | USB2N3 | USB_PN3 |
| | USB2N1 | USB_PN1 |
| | USB2N0 | USB_PN0 |

FIGS. 8A and 8B illustrate an exemplary pin-editing interface. In addition to the display of the queried recommendation information regarding pin configurations, the pin-editing interface 800 contains two duplication buttons 810 and 820. The processing unit 110 directs the display unit 120 to duplicate data of the "pin name" column into the cells of the "confirmation" column when detecting that the duplication button 810 is pressed by a user. Furthermore, the processing unit 110 directs the display unit 120 to duplicate data of the "recommended net name" column into the cells of the "confirmation" column when detecting that the duplication button 820 is pressed by the user. Every cell of the "pin name" column and the "recommended net name" column is un-editable to prevent the user from altering data, while every cell of the "confirmation" column is editable, enabling the user to decide a resulting net name. The pin-editing interface 800 further contains drop-down menus 830, 840 and 850. The user may set a connectivity status associated with a pin to "Yes" or "No"; an associated cross-page status to "Yes" or "No"; and an associated I/O status to the single-directional input "In", the single-directional output "Out" or the bi-directional I/O "Bi". The processing unit 110 stores the resulting user configuration data in the memory 150 and/or the storage device 140 when detecting that the user submits data via the pin-editing interface 800. Contrary to revision of net names on the graphical schematic diagram, the pin-editing interface 800 providing the data-table-based editing enables the user to unify the associated net names efficiently, and prevent the production machine from malfunctions caused by inconsistent naming between two pins that are supposed to be connected. The resulting user configuration data may be stored in a relational database, a text file, or others, with multiple transactions. Each transaction contains at least a group name, a confirmed net name, a connectivity status, a cross-page status, an I/O status, etc. The exemplary user configuration outcome may refer to the following table 3.

TABLE 3

| Group Name | Net Name | Connectivity Status | Cross-page Status | I/O Status |
|---|---|---|---|---|
| USB3_CTRX | USB3TP2 | Yes | Yes | Out |
| | USB3TP1 | Yes | Yes | Out |
| | USB3TN2 | Yes | Yes | Out |
| | USB3TN1 | Yes | Yes | Out |
| | USB3RP2 | Yes | Yes | In |
| | USB3RP1 | Yes | Yes | In |
| | USB3RN2 | Yes | Yes | In |
| | USB3RN1 | Yes | Yes | In |
| USB2_PN | USB2P7 | Yes | No | Bi |
| | USB2P6 | Yes | No | Bi |
| | USB2P5 | Yes | No | Bi |
| | USB2P4 | Yes | No | Bi |
| | USB2P3 | No | No | — |
| | USB2P1 | Yes | No | Bi |
| | USB2N7 | Yes | No | Bi |
| | USB2N6 | Yes | No | Bi |
| | USB2N5 | Yes | No | Bi |
| | USB2N3 | No | No | — |
| | USB2N2 | Yes | No | Bi |
| | USB2N1 | Yes | No | Bi |
| | USB2N0 | Yes | No | Bi |

Figure 9:
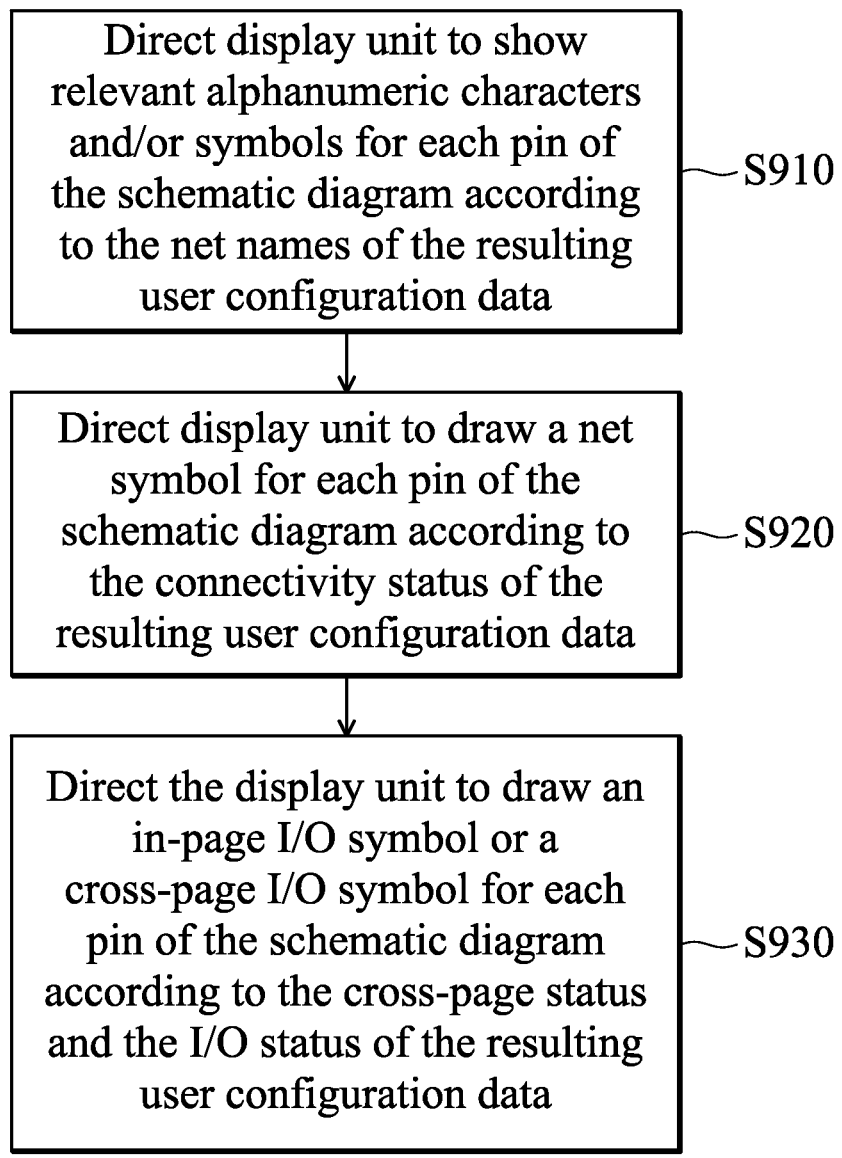
FIG. 9 is a flowchart illustrating a method for drawing a schematic diagram.

FIG. 9 is a flowchart illustrating a method for drawing a schematic diagram. In step S910, the processing unit 110 directs the display unit 120 to show relevant alphanumeric characters and/or symbols for each pin of the schematic diagram according to the net names of the resulting user configuration data. The exemplary drawing outcome may refer to the net name 430 of FIG. 4. In step S920, the processing unit 110 directs the display unit 120 to draw a net symbol for each pin of the schematic diagram according to the connectivity status of the resulting user configuration data. The exemplary drawing outcome may refer to the net symbol 410 of FIG. 4. In step S930, the processing unit 110 directs the display unit 120 to draw an in-page I/O symbol or a cross-page I/O symbol for each pin of the schematic diagram according to the cross-page status and the I/O status of the resulting user configuration data. The exemplary drawing outcome may refer to the in-page I/O symbol 420 and the cross-page I/O symbol 440 of FIG. 4.

Although the embodiment has been described as having specific elements in FIG. 1, it is noted that additional elements may be included to achieve better performance without departing from the spirit of the invention. While the process flows described in FIG. 6, FIG. 7 and FIG. 9 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A method for generating schematic diagrams, executed by a processing unit of an apparatus, comprising:
   generating, by the processing unit of the apparatus, a pin-editing interface comprising a data table to assist a user to configure pin settings, wherein the data table comprises a pin name column, a recommended net name column and a confirmation column, and the pin-editing interface comprises a first button and a second button; and directing, by the processing unit of the apparatus, a display unit to duplicate data of the pin name column into cells of the confirmation column when detecting that the first button is pressed;

directing, by the processing unit of the apparatus, the display unit to duplicate data of the recommended net name column into cells of the confirmation column when detecting that the second button is pressed;

obtaining, by the processing unit of the apparatus, a user setting via the pin-editing interface; and generating, by the processing unit of the apparatus, a schematic diagram on the display unit according to the user setting, wherein the schematic diagram comprises a component, and the component comprises a net name, a net symbol, an in-page I/O symbol and a cross-page I/O symbol associated with a pin.

2. The method of claim 1, wherein every cell of the pin name column and the recommended net name column is un-editable, and every cell of the confirmation column is editable.

3. The method of claim 2, wherein the pin-editing interface further comprises a first drop-down menu, a second drop-down menu and a third drop-down menu, the first drop-down menu is provided to assist the user to set a connectivity status associated with the pin, the second drop-down menu is provided to assist the user to set an I/O status associated with the pin, and the third drop-down menu is provided to assist the user to set a cross-page status associated with the pin.

4. The method of claim 3, wherein the user setting comprises the net name of the confirmation column, the connectivity status, the I/O status, and the cross-page status associated with the pin.

5. The method of claim 4, further comprising:
storing the user setting in a relational database.

6. The method of claim 5, further comprising:
querying a relational database server using SQL (structure query language) to obtain data displayed in the pin name column and the recommended net name column.

7. An apparatus for generating schematic diagrams, comprising:
a display unit; and
a processing unit, coupled to the display unit, the processing unit programmed to:

generate a pin-editing interface comprising a data table to assist a user to configure pin settings, wherein the data table comprises a pin name column, a recommended net name column and a confirmation column and the pin-editing interface comprises a first button and a second button;

direct a display unit to duplicate data of the pin name column into cells of the confirmation column when detecting that the first button is pressed;

direct the display unit to duplicate data of the recommended net name column into cells of the confirmation column when detecting that the second button is pressed;

obtain a user setting via the pin-editing interface; and generate a schematic diagram on the display unit according to the user setting, wherein the schematic diagram comprises a component, and the component comprises a net name, a net symbol, an in-page I/O symbol and a cross-page I/O symbol associated with a pin.

8. The apparatus of claim 7, wherein every cell of the pin name column and the recommended net name column is un-editable, and every cell of the confirmation column is editable.

9. The apparatus of claim 8, wherein the pin-editing interface further comprises a first drop-down menu, a second drop-down menu and a third drop-down menu, the first drop-down menu is provided to assist the user to set a connectivity status associated with the pin, the second drop-down menu is provided to assist the user to set an I/O status associated with the pin, and the third drop-down menu is provided to assist the user to set a cross-page status associated with the pin.

10. The apparatus of claim 9, wherein the user setting comprises the net name of the confirmation column, the connectivity status, the I/O status, and the cross-page status associated with the pin.

11. The apparatus of claim 10, wherein the processing unit further stores the user setting in a relational database.

12. The apparatus of claim 11, wherein the processing unit queries a relational database server using SQL (structure query language) to obtain data displayed in the pin name column and the recommended net name column.

13. The apparatus of claim 7, wherein the processing unit comprises a processor, processors or graphic processing unit.

14. The apparatus of claim 13, wherein the processing unit is programmed using microcode or software instructions.

* * * * *